Feb. 13, 1968 A. A. BOOTS 3,368,682
SYSTEM FOR REGENERATING COOKING OIL
Filed Dec. 23, 1964
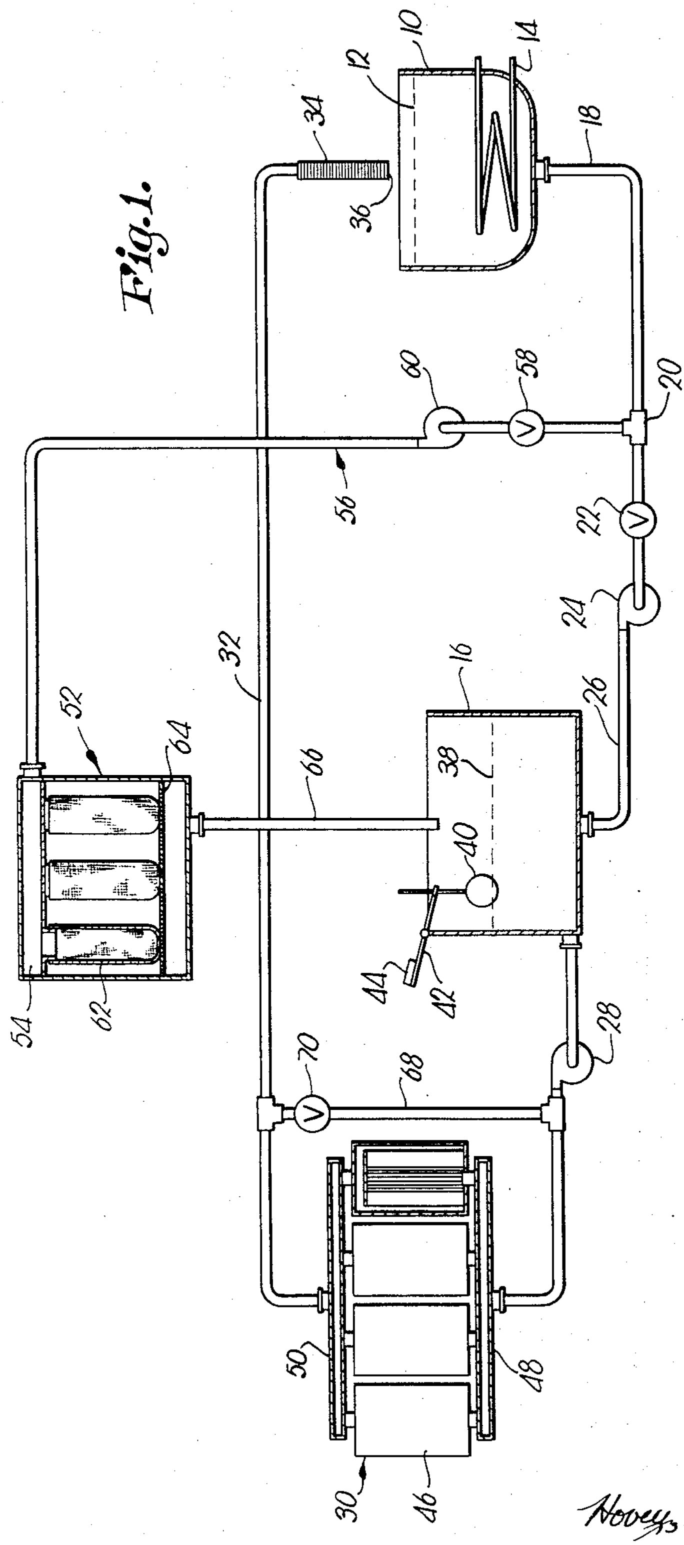
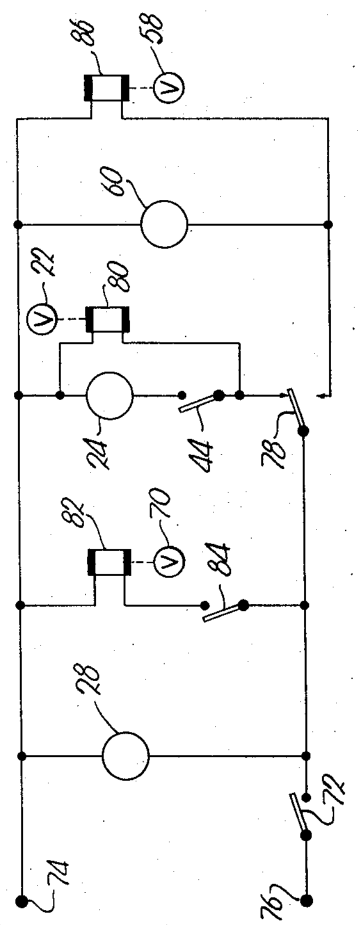
INVENTOR.
Arthur A. Boots
BY
Hovey, Schmidt, Johnson & Hovey
ATTORNEYS.

United States Patent Office 3,368,682

Patented Feb. 13, 1968

3,368,682

SYSTEM FOR REGENERATING COOKING OIL

Arthur A. Boots, 411 W. Central St., Carthage, Mo. 64836

Filed Dec. 23, 1964, Ser. No. 420,549
2 Claims. (Cl. 210—121)

ABSTRACT OF THE DISCLOSURE

A cooking oil regenerating system having an oil reservoir and a cooking vessel. A control circuit operates electrically responsive valves and pumps to normally flow the oil through a filtering circuit to remove impurities suspended in the oil. The control circuit also operates electrically responsive valves and pumps to bypass the filter and to flow the oil at increased pressure through a strainer circuit and into the vessel to flush impurities from the cooking vessel. A flexible outlet facilitates manual manipulation of the oil stream to assist in the flushing operation.

This invention relates to a system for filtering particulate impurities from cooking oil or the like and, more particularly, to such a system for use in deep fat frying operations which will provide optimum cooking results.

Deep fat frying is a common technique utilized in present-day restaurant operations. Although quite popular, deep fat frying presents a problem in that particulate materials accumulate in the cooking oil during use, necessitating that the fryer be periodically cleaned since much of this material does not become suspended in the cooking oil but, instead, forms a sediment in the bottom of the frying tank which will impair the taste of the food cooked therein if allowed to accumulate. However, previous efforts to obviate this difficulty, such as by filtering the cooking oil as it is pumped through a supply system, have not proven satisfactory because only the particles in suspension in the oil can be removed by such a system.

As an additional complication, the cooking oil is quite hot during use (approximately 350° F.) and, therefore, changing of the oil is a hazardous operation. Manifestly, much time is lost if the restaurant operator waits for the oil to cool before attempting to clean the fryer tank. Of course, the oil may simply be discarded, but this is expensive since, to be assured that the cooked product has the proper taste, the sediment in the tank should be removed frequently.

Heretofore, conventional filtering systems have also been plagued by the tendency of the sediment to clog the filtering system. Thus, to avoid clogging of the filter system, it has been necessary for the operator to manually break up the mass of settled material and drain the same from the cooking tank at the end of a day's operation or whenever the tank is to be cleaned. This involves manually stirring the mass of material and attempting to strain it through a fabric sack or bag as the oil is drained from the tank.

It is, therefore, the primary object of this invention to provide a means for regenerating cooking oil or the like to maintain the same free from particulate impurities whether suspended in the oil or present in the form of a sediment.

It is another object of this invention to provide a regenerating system as aforesaid which supplies the cooking tank with filtered oil during use and also provides a means for flushing the tank after use to remove the collected impurities therefrom without loss of cooking oil from the supply system.

Still another object of this invenion is to provide such a system that will rapidly and safely effect the flushing operation when it is desired to clean the tank without the necessity of the operator allowing the oil to cool or manipulating the tank in any way.

Other objects will become apparent as the detailed description proceeds.

In the drawing:

FIG. 1 is a diagrammatic representation of the regenerating system; and

FIG. 2 is a schematic diagram of the electrical control circuitry.

The numeral 10 designates a vessel in the form of a fryer tank which is adapted to hold a quantity of cooking oil therein. The approximate normal level of the oil is indicated at 12. An electrical heating element 14 may be utilized to heat the oil to the desired temperature for cooking purposes. It is pointed out that vessel 10 has been illustrated only diagrammatically in the drawing and that those skilled in the art will recognize that vessel 10 may be of sufficient size to accommodate any desired frying structure as may be utilized in the cooking operation. Further, the precise location of the oil inlet (to be described hereinafter) with respect to the open top of the vessel may be chosen to permit operator access to the vessel without undue danger of contact by heated oil, all as will be readily apparent to those skilled in this art.

Oil for vessel 10 is supplied by a reservoir 16. A drainpipe 18 communicates the bottom of vessel 10 with a T 20 which joins the pipe with a valve 22, a pump 24, and a conduit 26 communicating with the bottom of reservoir 16. Pump 24 is utilized to return oil from vessel 10 to reservoir 16. Oil from the reservoir is supplied to the vessel by a pump 28 which operates continuously and feeds the oil through a filter 30 and along conduit 32 to a flexible tube 34 having a discharge outlet 36. Tube 34 is disposed above the open top of vessel 10 and directs the discharging oil into the vessel to replace oil drawn therefrom by pump 24.

Since pump 28 operates continuously, oil is always discharging from outlet 36 and, therefore, the level 12 in vessel 10 tends to rise. This causes a corresponding drop in the oil level 38 of reservoir 16 which is monitored by a float 40 connected to an arm 42 pivotally mounted on the side of the reservoir. A mercury switch 44 is mounted on arm 42 so as to be responsive to movement thereof caused by vertical shifting of float 40 with changes in the oil level 38 of reservoir 16. As will be described more fully hereinafter, switch 44 controls the energization of pump 24 and effects pump operation when the oil level 38 falls to a predetermined value. It should be understood that various level responsive control means could be utilized, the float and mercury switch arrangement being shown herein as illustrative only.

Filter 30 is shown having four filter elements 46 connected in parallel by an inlet manifold 48 and an outlet manifold 50, the latter being communicated with conduit 32 while the inlet manifold 48 is in communication with the outlet of pump 28. Filter elements 46 may comprise any one of a number of well-known filtering devices such as, for example, a disposable filter of the type in widespread use in vehicles for filtering crankcase oil.

A strainer 52 is utilized when it is desired to flush sediment or other collected impurities from vessel 10. The strainer has a distribution chamber 54 which is communicated with drainpipe 18 at T 20 by a pump line 56 having a valve 58 in series with a pump 60. Chamber 54 communicates oil flowing thereinto to a number of porous bags or sacks 62 which rest on a perforated plate 64. The outlet from strainer 52 is taken from the bottom thereof beneath plate 64 and is communicated with reservoir 16 by a pipe 66. Straining of the oil is accomplished by the porous bags 62 which may be discarded and replaced after each straining operation. A bypass 68 shunting filter 30 may be rendered operative by opening a valve 70 therein to eliminate the pressure drop across filter 30 and substantially increase the discharge force of the oil emanating from outlet 36 to flush collected impurities from the vessel for passage to the strainer.

During normal operation when vessel 10 is being utilized for cooking purposes, the pumping circuit comprising pump 28 and conduit 32 which supplies oil to the vessel, and drain pipe 18 and pump 24 which returns oil to the reservoir from the vessel, functions to maintain oil level 12 within a desired range and continuously filter the oil. At this time, valve 22 is open and valves 58 and 70 are closed. The valves are solenoid-controlled, and pumps 24, 28 and 60 are operated by electric motors illustrated schematically in FIG. 2 and indicated by the same reference numerals as the pumps which they drive.

In FIG. 2, terminals 74 and 76 of the control circuitry there shown are coupled with a suitable source of electrical power (not shown). Closure of switch 72 renders the circuitry operative, causing continuous operation of pump 28. A two-position selector switch 78 is shown engaging its upper contact, this position of switch 78 effecting operation of the pump circuit to continually supply vessel 10 with filtered oil and maintain the level 12 therein. In this mode of operation, a solenoid 80 for controlling valve 22 is maintained in its energized state to hold valve 22 open.

Valve 70 is operated by a solenoid 82 which is under the control of a normally open switch 84. Valve 58 is operated by a solenoid 86 which is energized when switch 78 is moved to its other position establishing a circuit through the lower contact thereof. Valves 22, 58 and 70 are closed when the corresponding solenoids are de-energized and open upon energization thereof. Thus, when the control circuitry is in the condition as illustrated in FIG. 2, only the valve 22 will be open, permitting oil to flow from vessel 10 to reservoir 16 when pump 24 is in operation.

Since pump 28 runs continuously, oil from reservoir 16 is at all times flowing into vessel 10 and raising the oil level 12 thereof. This, in turn, decreases the level 38 of the oil in reservoir 16 and, once a predetermined minimum level is reached, mercury switch 44 closes and pump 24 commences operation. In this manner, the oil in vessel 10 is prevented from overflowing the vessel and is intermittently returned to reservoir 16 for subsequent filtering by filter 30.

It should be understood that filter 30 will only be effective to any great extent in the removal of impurities in suspension in the oil. Other particles which settle to the bottom of vessel 10 or tend to cling to the walls thereof will, for the most part, remain in vessel 10 since there will not be a continual current of oil flowing through the vessel to flush these impurities therefrom. Manifestly, to maintain the cooking oil at the desired temperature and prevent excessive agitation thereof which would interfere with the cooking, supply of oil to the vessel and removal therefrom by the filter circuit must be relatively gradual.

At the end of a day's operation, for example, when it is desired to purge the vessel of collected impurities, switch 78 is operated to establish a circuit through its lower contact, thereby disabling pump 24 and de-energizing solenoid 80 to close valve 22. Simultaneously, valve 58 is opened by energization of solenoid 86 and pump 60 is placed in operation. The cumulative effect of this action is to drain the oil from vessel 10 and direct this oil to reservoir 16 while simultaneously permitting filtered oil to be supplied to vessel 10 by way of conduit 32. Then, once the oil is completely drained from vessel 10 or pumped down to a low level, closure of switch 84 energizes solenoid 82 to open valve 70 and permit the oil emanating from the outlet of pump 28 to flow through bypass 68 to conduit 32. Here again, those skilled in this art will recognize that strainer 52 and its associated lines will have sufficient capacity to permit substantial or complete emptying of oil from vessel 10. The pressure drop formerly encountered by pumping the oil through filter 30 is thus eliminated, resulting in a substantial increase in the discharge force of the oil flowing from outlet 36. This high pressure stream serves to flush the sediment or other collected impurities from the walls and bottom of vessel 10, whereupon the oil with these impurities entrained therein is pumped to the strainer 52 where the impurities are collected in the bags 62 and the strained oil permitted to flow to reservoir 16. Manifestly, after cleaning of the vessel, switch 84 may be opened and selector switch 78 returned to the position shown to again prepare the vessel for cooking.

An important feature of the instant invention is the provision of the flexible tube 34 which is disposed above the open top of the vessel. This allows the operator to direct the high velocity flushing stream against the walls and bottom of the vessel to provide efficient flushing action and dislodging of the impurities. Due to the heat of the oil, tube 34 will likely be quite hot and, therefore, should be manually manipulated by tongs to protect the operator.

Having thus described the invention, what is claimed as new and desired to be secured by Letters Patent is:

1. Apparatus for regenerating cooking oil or the like to maintain the same free from impurities, said apparatus comprising:

an open top vessel adapted to contain a quantity of said oil;

an oil supply reservoir;

a conduit communicating the reservoir with the vessel for flow of oil thereinto from the reservoir;

a filter interposed in the conduit for removing suspended impurities from the oil during said flow of the latter from the reservoir to the vessel;

terminal means adapted for coupling with a source of electrical energy;

first electrically responsive pump means in said conduit and coupled with said terminal means for pumping said oil from the reservoir through said filter to the vessel;

a return pipe communicating the vessel with the reservoir;

second electrically responsive pump means in said pipe;

oil level responsive switching means in the reservoir electrically coupled with said second pump means;

electrically responsive, normally closed valve means in said pipe;

a bypass communicating with said conduit upstream and downstream from said filter;

electrically responsive, normally closed valve means in said bypass;

a line communicating the vessel with the reservoir and establishing a path for flow of said oil in shunt relationship to said second pump means and the valve means in said pipe;

a strainer in said line;

third electrically responsive pump means in said line for pumping oil from the vessel through the strainer into the reservoir;

electrically responsive, normally closed valve means in the line;

circuitry coupling said oil level responsive switching means, said valve means in said pipe, said third pump means, and said valve means in the line with said terminal means, said circuitry including a selector switch having a first, filter position for establishing an energizing circuit to said oil level responsive switching means and said valve means in the pipe to open the latter, and a second, cleanout position establishing an energizing circuit to said third pump means and the valve means in the line to open the latter, said oil level responsive switching means being operable to energize said second pump means in response to sensing of a predetermined minimum level of oil in said reservoir; and means for coupling the valve means in said bypass to said terminal means to open the latter valve means, whereby the oil is filtered when the selector switch is in its first position, and is flushed from the vessel under increased pressure and strained when the selector switch is in its second position and the valve means in the bypass is open.

2. Apparatus as set forth in claim 1 wherein said conduit includes a flexible tube at the outlet end of said conduit in proximity to said vessel, whereby the stream of oil flowing into said vessel may be manually manipulated to assist in flushing impurities from said vessel.

References Cited

UNITED STATES PATENTS

| | | | |
|---|---|---|---|
| 1,234,131 | 7/1917 | Cleveland | 210—194 X |
| 1,346,898 | 7/1920 | Kingsbury | 210—97 X |
| 2,149,956 | 3/1939 | Damrow | 210—299 X |
| 2,316,669 | 4/1943 | Busi | 210—167 X |
| 2,430,097 | 11/1947 | Bauer | 210—257 X |
| 2,546,163 | 3/1951 | McBeth | 99—408 |
| 2,733,815 | 2/1956 | Kwochka et al. | 210—416 X |
| 2,760,641 | 8/1956 | Mies et al. | 210—318 X |
| 3,100,747 | 8/1963 | Hall | 210—167 |
| 3,107,601 | 10/1963 | Longmire | 99—330 |
| 3,263,818 | 8/1966 | Gedrich | 210—416 |

REUBEN FRIEDMAN, *Primary Examiner.*

W. S. BRADBURY, *Assistant Examiner.*